US007482410B2

(12) United States Patent
Fischbuch

(10) Patent No.: US 7,482,410 B2
(45) Date of Patent: Jan. 27, 2009

(54) PROCESSES FOR PRODUCING HIGH DENSITY POLYETHYLENE

(75) Inventor: D. Brett Fischbuch, Kingwood, TX (US)

(73) Assignees: ExxonMobil Chemical Patents Inc., Houston, TX (US); Saudi Basic Industries Corporation, Riyadh (SA); Saudi Yanbu Petrochemical Company, Yanbu Al Sinalyah (SA)

( * ) Notice: Subject to any disclaimer, the term of this patent is extended or adjusted under 35 U.S.C. 154(b) by 36 days.

(21) Appl. No.: 11/386,289

(22) Filed: Mar. 22, 2006

(65) Prior Publication Data

US 2006/0223958 A1 Oct. 5, 2006

Related U.S. Application Data

(60) Provisional application No. 60/666,982, filed on Mar. 31, 2005.

(51) Int. Cl.
*C08F 2/34* (2006.01)
*C08F 10/02* (2006.01)

(52) U.S. Cl. .............................. 526/68; 526/67; 526/82; 526/83; 526/84; 526/901; 526/905

(58) Field of Classification Search .................... 526/82, 526/83, 84, 67, 68, 901, 905
See application file for complete search history.

(56) References Cited

U.S. PATENT DOCUMENTS

| 3,324,095 | A | 6/1967 | Carrick et al. |
| 3,324,101 | A | 6/1967 | Baker et al. |
| 3,704,287 | A | 11/1972 | Johnson |
| 4,003,712 | A | 1/1977 | Miller |
| 4,803,251 | A | 2/1989 | Goode et al. |
| 5,066,736 | A | 11/1991 | Dumain et al. |
| 5,137,994 | A | 8/1992 | Goode et al. |
| 5,352,749 | A | 10/1994 | DeChellis et al. |

(Continued)

FOREIGN PATENT DOCUMENTS

EP 0 359 444 3/1990

(Continued)

*Primary Examiner*—Fred M Teskin

(57) ABSTRACT

Processes for reducing the ultra high molecular weight polymeric material content of a high density polyethylene produced with a bis-triarylsilyl chromate catalyst system are provided. Processes for reducing the gel content of articles produced from high density polyethylene are also provided. The gel content of the articles is reduced by using the high density polyethylene with reduced ultra high molecular weight polymeric material content to produce the articles. The processes described reduce the content of ultra high molecular weight polymeric material in comparison to conventional high density polyethylene by introducing at least one catalyst deactivator into a recycle gas line containing a recycle gas stream associated with the fluidized bed reactor. The at least one catalyst deactivator has a boiling point lower than the maximum temperature within the recycle gas line. In certain embodiments, the at least one catalyst deactivator is introduced in the portion of the recycle gas line upstream of a recycle gas cooler at a ratio of 0.0075 mole of the at least one catalyst deactivator per 1 million moles of make-up ethylene to about 0.12 mole of the at least one catalyst deactivator per 1 million moles of make-up ethylene in the reaction system. In certain embodiments, the at least one catalyst deactivator is oxygen.

53 Claims, 4 Drawing Sheets

U.S. PATENT DOCUMENTS

| | | | |
|---|---|---|---|
| 5,462,999 A | 10/1995 | Griffin et al. | |
| 5,625,012 A | 4/1997 | Hussein et al. | |
| 6,022,933 A | 2/2000 | Wright et al. | |
| 6,878,454 B1 * | 4/2005 | Shannon et al. | 428/523 |
| 2004/0236040 A1 | 11/2004 | Mihan et al. | |

FOREIGN PATENT DOCUMENTS

| | | |
|---|---|---|
| EP | 0 449 519 | 10/1991 |
| WO | WO 99/09075 | 2/1999 |
| WO | WO 03/042253 | 5/2003 |

* cited by examiner

US 7,482,410 B2

PROCESSES FOR PRODUCING HIGH DENSITY POLYETHYLENE

CROSS-REFERENCE TO RELATED APPLICATIONS

This application claims the benefit of U.S. Provisional Application 60/666,982, filed Mar. 31, 2005, which is fully incorporated herein by reference.

FIELD OF THE DISCLOSURE

This disclosure relates to processes for producing high density polyethylene with reduced ultra high molecular weight polymeric material content suitable for producing articles having reduced gel content.

BACKGROUND OF THE DISCLOSURE

Numerous systems and processes for polymerizing olefins are known. Introduction of various compounds into polymerization reactors to control polymer product properties is also known. For example, U.S. Pat. No. 6,022,933 to Wright, et al., discloses the addition of a "catalyst poison", such as oxygen, to a fluidized bed reactor used to produce high density polyethylene using bis-triarylsilyl chromate catalyst systems. The catalyst poison is added directly to the reactor or in a gas recycle line at a location downstream of the associated recycle gas cooler. The '933 patent discloses that the catalyst poison is to be introduced into the reactor in the range of about 0.005 to about 0.5 part by volume per million parts by volume of ethylene feed to the reactor. The catalyst poison is added in this manner to increase environmental stress crack resistance of articles made with the polymer produced. The '933 patent refers to the addition of oxygen as "oxygen addback". Another effect attributed to the "oxygen addback" is lowering the molecular weight of the high density polyethylene produced.

U.S. Pat. No. 4,803,251 to Goode, et al., discloses a process for the reduction of sheeting during polymerization of alpha-olefins by the introduction of positive charge generating additives or negative charge generating additives into the polymerization reactor to neutralize the static charge in the reactor. The polymerization processes disclosed are for use with titanium or vanadium catalysts with aluminum cocatalysts. Positive charge generating additives are identified as alcohols containing up to 7 carbon atoms, oxygen, and nitric acid. Methanol is described as the preferred positive charge-generating additive. Negative charge generating additives are identified as ketones containing up to 7 carbon atoms such as acetone and methyl isobutyl ketone. The '251 patent describes that the additives are to be added to the reactor. Introduction of the additives to the recycle stream "just upstream of the inlet to the bottom of the reactor vessel" is described and exemplified. This location is downstream of the recycle stream compressor and cooler.

Addition of compounds to the recycle gas stream in olefin polymerization systems is known. For example, Published U.S. Patent Application 2004/0236040 to Mihan, et al., discloses the introduction of a liquid catalyst poison upstream of a cyclone separator positioned in the recycle stream. The liquid catalyst poison serves to "wet" fine dust particles to facilitate removal of the particles from the recycle gas in the cyclone. Another effect attributed to the catalyst poison wetting the dust particles is that the catalyst poison is removed from the circulating gas to prevent it from reaching the reactor where it "can have an adverse effect on the polymerization reaction." The Application also indicates that the fine dust wetted by the catalyst poison that is not removed in the cyclone serves to avoid undesirable polymerization and deposit formation in the circulating gas. The Application discloses that the catalyst poison must have a boiling point above the maximum temperature within the recycle stream.

U.S. Pat. No. 5,066,736 to Dumain, et al., discloses the addition of an activity retarder into a reaction system for polymerization of alpha-olefins, particularly linear low density polyethylene. The activity retarder may be a polymerization inhibitor. The retarder is added to the polymerization system to control the temperature within the polymerization reactor. The retarder may be added directly to the reactor; to a monomer feed line; to a recycle separator device such a cyclone separator, to a recycle line from the cyclone separator, or to a reaction mixture recycle line located downstream of a heat exchanger used to cool the reaction mixture recycle stream.

BRIEF DESCRIPTION OF THE INVENTION

This invention relates to processes for reducing the concentration of ultra high molecular weight ("UHMW") polymeric material when producing high density polyethylene with bis-triarylsilyl chromate catalyst systems in fluidized bed reactors and processes for producing articles from the high density polyethylene. The processes are useful for producing high density polyethylene suitable for conversion into films and other articles having reduced gel contents. In addition to films, the high density polyethylene is suitable for production of a variety of articles having reduced gel content such as pipes, geomembranes, and molded articles.

The gel content in the films and articles is reduced by the reduction of the concentration of UHMW polymeric material in the polyethylene produced by the processes described herein. The processes described herein reduce the content of UHMW polymeric material in comparison to conventional high density polyethylene production processes by introducing at least one catalyst deactivator into a recycle gas stream at a location selected from (i) upstream of a recycle gas cooler associated with the fluidized bed reactor, (ii) into the recycle gas cooler, (iii) 2 meters or less downstream of the outlet of the recycle gas cooler, (iv) 1 meter or less downstream of the outlet of the recycle gas cooler, and (v) combinations thereof. The at least one catalyst deactivator has a boiling point lower than the maximum temperature within the recycle gas line.

In certain embodiments, the at least one catalyst deactivator is introduced at a ratio of 0.0075 mole of the at least one catalyst deactivator per 1 million moles of make-up ethylene feed to about 0.12 mole of the at least one catalyst deactivator per 1 million moles of make-up ethylene feed. In certain embodiments, the at least one catalyst deactivator is oxygen.

DETAILED DESCRIPTION OF THE INVENTION

Figure 1:
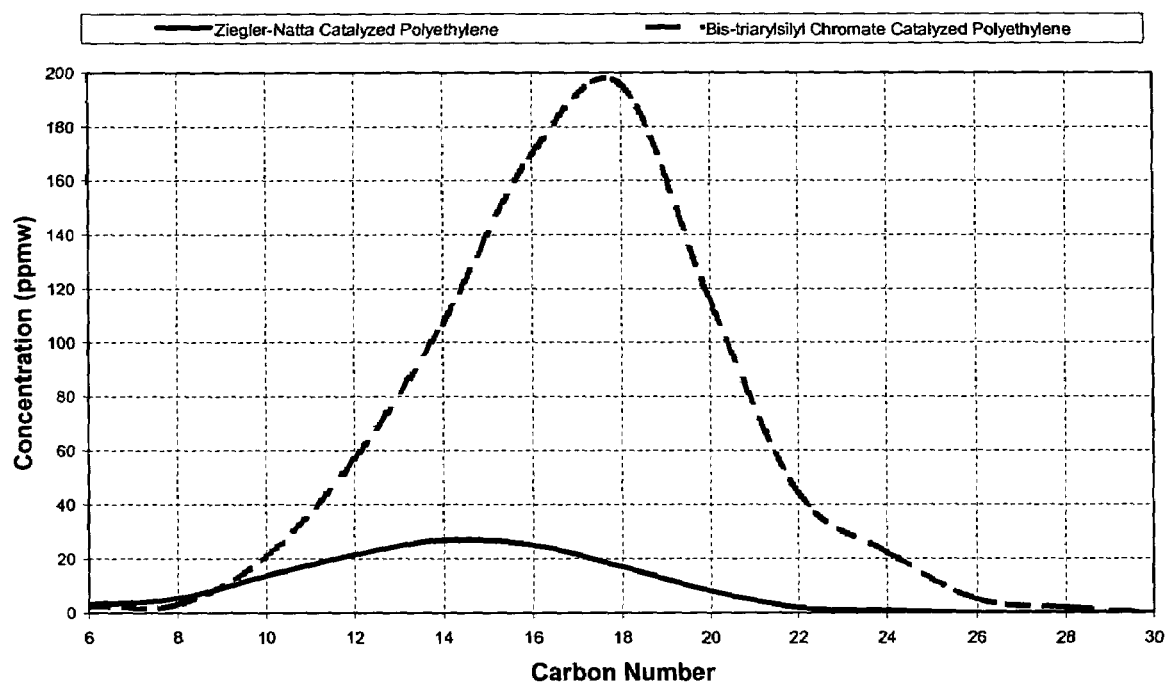
FIG. 1 is a graphical representation of oligomer content of polyethylene resins produced with bis-triarylsilyl chromate catalyst systems compared to the oligomer content of polyethylene resins produced with Ziegler-Natta catalyst systems.

A variety of advantages are obtained by production of high density polyethylene using bis-triarylsilyl chromate catalyst systems. However, it is observed that such catalyst systems frequently impart increased gel content in films and other articles produced from such high density polyethylene.

Gels in films and other articles result, at least in part, from the presence of UHMW polymeric material in the high density polyethylene used to produce the films and other articles. This disclosure relates to processes for producing high density polyethylene using bis-triarylsilyl chromate catalyst systems. This disclosure also relates to processes for reducing the concentration of UHMW polymeric material in such high density polyethylene resins. Additionally, this disclosure relates to processes for reducing gels in films and other articles produced from high density polyethylene resins.

For purposes of this disclosure, the term "high density polyethylene" refers to polymers incorporating at least 90 wt. % of polymeric units derived from ethylene monomers and having a density of about 0.94 g/cm$^3$ to about 0.965 g/cm$^3$. In certain embodiments, high density polyethylene produced by the processes described herein has a density of about 0.94 g/cm$^3$ to about 0.96 g/cm$^3$. In other embodiments, high density polyethylene produced by the processes described herein has a density of about 0.948 g/cm$^3$ to about 0.958 g/cm$^3$.

High density polyethylene, as described herein, is produced by polymerizing ethylene alone, or optionally, in the presence of at least one comonomer. The ethylene and the optional at least one comonomer should be present at certain concentrations in the reactor for a given catalyst to produce a polyethylene of a certain density and melt index. The density and melt index of the polyethylene generally depend on how well a catalyst incorporates the at least one comonomer. Suitable comonomers include olefins having from 3 to 20 carbon atoms in one embodiment and 3 to 12 carbon atoms in other embodiments. Exemplary comonomers include propylene, butene, pentene, 4-methylpentene, hexene, octene, decene, and cyclic olefins such as styrene. Other monomers can include polar vinyl, dienes, norborene, acetylene and aldehyde monomers.

In certain embodiments, the at least one optional comonomer is selected from the group of $C_4$ to $C_8$ alpha-olefins, and mixtures thereof. In other embodiments, the at least one comonomer is selected from the group of butene, pentene, hexene, octene, and mixtures thereof. In still other embodiments, the at least one comonomer is selected from the group of butene, hexene, octene, and mixtures thereof. In additional embodiments, the at least one comonomer is selected from the group of butene, hexene, and mixtures thereof and the high density polyethylene has a density of about 0.948 g/cm$^3$ to about 0.958 g/cm$^3$.

The ratio of the at least one comonomer to the ethylene, when present, in the high density polyethylene may vary over a range. Typical concentration ranges of the at least one comonomer in the high density polyethylene range up to 10 wt. %. In certain embodiments, the concentration of the at least one comonomer may range up to 5 wt. %. In other embodiments, the concentration of the at least one comonomer is from about 0.1 wt. % to about 5 wt. %. In still other embodiments, the level of incorporation of the at least one comonomer is from about 0.1 wt. % to about 2 wt. %.

In certain embodiments, the molar ratio of the at least one comonomer to ethylene in the fluidized bed reactor is about 0.001:1 to about 0.015:1. In additional embodiments, the molar ratio of the at least one comonomer to ethylene in the fluidized bed reactor is about 0.002:1 to about 0.008:1. In still other embodiments, the molar ratio of the at least one comonomer to ethylene in the fluidized bed reactor is about 0.003:1 to about 0.006:1. The molar ratio of the at least one comonomer to ethylene in the reactor, of course, corresponds to the molar ratio of monomers incorporated into the high density polyethylene.

The fluidized bed of the reaction systems used in the processes described herein may also contain hydrogen, typically to control the melt index of the high density polyethylene produced. In certain embodiments, hydrogen is introduced into the fluidized bed reactor at a concentration of in the range of about 0.005 mole to about 0.08 mole of hydrogen per mole of ethylene. In other embodiments, hydrogen is introduced into the fluidized bed reactor at a concentration of in the range of about 0.0075 mole to about 0.05 mole of hydrogen per mole of ethylene. In still other embodiments, hydrogen is introduced into the fluidized bed reactor at a concentration of in the range of about 0.01 mole to about 0.04 mole of hydrogen per mole of ethylene.

The processes described herein are useful for producing high density polyethylene suitable for conversion into films and other articles having reduced gel contents. The processes described herein are particularly suitable for producing polyethylene polymerized with bis-triarylsilyl chromate catalyst systems in fluidized bed reactors.

Gels are unmelted polymer particles or streaks in the polymeric material matrix forming an article. With respect to films, gels generally have a thickness greater than the gauge of the film matrix. The gels are also typically more opaque than the film matrix. The dominant gel type observed in films produced from high density polyethylene resins catalyzed with bis-triarylsilyl chromate catalyst systems is a round semi-opaque gel with a melting point that is 0° C. to 5° C. above the melting point of the film matrix. Even if the gels have the same melting point as the as the polymeric material surrounding the gel, the gel may not melt upon melting of the polymeric material because the thickness or other geometric dimensions of the gels may prevent them from heating to the melting point. Excessive gel levels result in poor visual appearance of extruded films and other articles and may lead to breakage or failure during production or use of the film or article. Generally, when gel levels exceed a certain threshold level, a film or article is rendered substandard and must be disposed of or sold at a reduced cost.

It is believed that one factor contributing to the formation of gels is the presence of UHMW polymeric material in the high density polyethylene used to produce the films and articles exhibiting gels. It is believed that gels become larger and occur at greater concentrations as UHMW materials accumulate in the recycle gas system particularly in the lower temperature regions that exist from the recycle-gas-line cooler to the reactor distributor plate. It is believed that polymeric particles exiting the recycle line cooler may adhere to downstream surfaces and continue to polymerize to produce UHMW materials in the lower temperature regions of the of the recycle system.

It is believed that polymeric particles have a greater propensity to adhere to surfaces in the lower temperature regions of reaction systems employing bis-triarylsilyl chromate catalyst systems than in reaction systems utilizing other catalyst systems because of the higher oligomer concentrations typically present in bis-triarylsilyl chromate catalyzed material. FIG. 1 is a graphical representation of $C_6$ to $C_{26}$ oligomer concentrations measured in granular resin samples using two methods: 1) short-path thermal desorption gas chromatography using a mass spectroscopic detector, and 2) gas chromatography of liquid extracts from the granular resins. High density polyethylene produced with a bis-triarylsilyl chromate catalyst system and a high density polyethylene catalyzed with a Ziegler-Natta catalyst were analyzed. The oligomer concentrations are reported as ppm by weight of the oligomer per 1 million parts by weight polyethylene. It is seen that in the $C_{10}$ to $C_{24}$ oligomer range, the bis-triarylsilyl chromate catalyst system produces dramatically higher concentrations of oligomers. These oligomers are present in the cycle gas in sufficient concentrations to condense on surfaces in the lower temperature regions of the reaction system. It is believed that the condensed oligomers provide a sticky surface to which polymeric particles adhere. Bis-triarylsilyl chromate catalyst systems have greater longevity and more activity than Ziegler-Natta catalysts in the lower temperature regions from the cooler to the distributor plate. Thus, the chromate catalyst systems are still active and will continue to polymerize polymeric particles into UHMW polymeric material at the sticky surface created by the oligomeric material.

It is thought that after the adhered particles polymerize into UHMW polymeric materials, some of the UHMW materials periodically break off from the surfaces to which they are adhered and are carried into the fluidized bed where they are mixed with the desirable lower molecular weight high density polyethylene product. The UHMW polymeric material serves as a precursor to gels in films and articles produced from the high density polyethylene.

For purposes of this disclosure, the term "UHMW polymeric material" refers to polymeric material having a weight average molecular weight ($M_w$) of greater than 500,000. (The weight average molecular weight can actually be much higher, in the range of 1-2,000,000, or even higher.) High density polyethylene resins produced with bis-triarylsilyl chromate catalyst systems typically have a weight average molecular weight of about 75,000 to about 350,000.

The processes described herein are thought to reduce the formation of UHMW polymeric materials in the lower temperature regions of reaction systems employing bis-triarylsilyl chromate catalyst systems. The reduction in the formation of these UHMW polymeric materials thereby reduces the concentration of gel precursors in the high density polyethylene and correspondingly provides a reduction in gels in films and other articles produced from the high density polyethylene. The processes described herein reduce the formation of UHMW polymeric materials by the introduction of at least one catalyst deactivator in the reaction system recycle line at a location selected from (i) upstream of a recycle gas cooler associated with the fluidized bed reactor, (ii) into the recycle gas cooler, (iii) 2 meters or less downstream of the outlet of the recycle gas cooler, (iv) 1 meter or less downstream of the outlet of the recycle gas cooler and (v) combinations thereof.

The at least one catalyst deactivator has a boiling point lower than the maximum temperature within the recycle gas line. For purposes of determining the maximum temperature and pressure within the recycle line, various equipment through which the recycle gas stream is routed such as compressors and recycle coolers are considered to be part of the recycle gas line. In certain embodiments, the at least one catalyst deactivator has a boiling point lower than the minimum temperature within the recycle gas line. In certain embodiments, the boiling point of the at least one catalyst deactivator is determined at the highest pressure within the recycle line. In other embodiments, the boiling point is determined at standard pressure, 1 atmosphere (101.3 kPag).

In certain embodiments of the processes described herein, the maximum temperature within the recycle gas line is about 120° C., the minimum temperature within the recycle line is about 25° C., and the maximum pressure within the recycle gas line is about 2,000 kPag to about 2,600 kPag. In other embodiments of the processes described herein, the maximum temperature within the recycle gas line is about 115° C., the minimum temperature within the recycle line is about 30° C., and the maximum pressure within the recycle gas line is about 2,000 kPag to about 2,600 kPag. In additional embodiments, of the processes described herein, the maximum temperature within the recycle gas line is about 110° C., the minimum temperature within the recycle line is about 35° C., and the maximum pressure within the recycle gas line is about 2,000 kPag to about 2,600 kPag.

Introduction of the at least one catalyst deactivator inhibits the catalytic activity of bis-triarylsilyl chromate catalyst system particles entrained in the recycle gas, particularly in the lower temperature regions of the recycle system within and downstream of the recycle line cooler. Due to the inhibited catalytic activity, continued polymerization of the polymeric particles that are trapped by condensed oligomers and adhered to the metal surfaces, and other polymeric particles, is inhibited. Therefore, reduction in the creation of UHMW polymeric material that serves as gel precursors in high density polyethylene and gels in films and other articles produced therefrom is reduced.

At least one other mechanism, in addition to the mechanism described above, may promote generation of gel precursors in high density polyethylene catalyzed by bis-triarylsilyl chromate catalyst systems. It is believed that the processes described herein also disrupt these other potential gel-formation mechanisms, thereby contributing to further reduction of gel precursors. Although this mechanism is not fully understood, an initial and immediate reduction in gel concentrations in films and articles produced from high density polyethylene produced by the processes described herein would confirm disruption of the mechanism.

Based upon a reduction in the formation and growth of UHMW polymeric materials as described above, a reduction of gels in the later stages of a polymerization run are explained. However, a reduction in gels in the initial stages of a polymerization run are unexplained by a reduction in the formation UHMW materials over time. Therefore, it is thought that another mechanism contributes to formation of gel precursors in the early stages of a polymerization run, and likely the later stages as well, is disrupted by the processes described herein.

As used herein, the term "bis-triarylsilyl chromate catalyst system" refers to the supported reaction product of at least one bis-hydrocarbylsilyl chromate and at least one compound selected from the group consisting of hydrocarbylaluminum compounds and hydrocarbylboron compounds. Exemplary catalyst systems are described in U.S. Pat. No. 5,137,994. Bis-tryarylsilyl chromates and methods of their preparation are described in U.S. Pat. Nos. 3,324,095; 3,324,101; and 3,704,287. Exemplary bis-triarylsilyl chromates are bis-triphenylsilyl chromate; bis-tritolylsilyl chromate; bis-trixylylsilyl chromate; bis-trinaphthylsilyl chromate; bis-triethylphenylsilyl chromate; bis-trimethylnaphthylsilyl chromate; and bis-adamantyl chromate. The hydrocarbylaluminum compound may be described as a co-catalyst, as a promoter, or as a reducing agent when it is reacted with the chromate prior to carrying out the copolymerization.

Exemplary hydrocarbylaluminum compounds include trihydrocarbylaluminum compounds, hydrocarbylaluminum halides, hydrocarbylaluminum hydrocarbyloxides, and hydrocarbylaluminum hydrides. In these compounds, the hydrocarbyl group can contain from 1 to about 14 carbon atoms, and the halogen may be chlorine, bromine, fluorine, or iodine. The hydrocarbyl group can be an alkyl, aralkyl, aryl, alkaryl, alicyclic, or bicyclic group. Examples of the hydrocarbylaluminum compounds are trimethylaluminum, triethylaluminum, tributylaluminum, tridecylaluminum, tridodecylaluminum, diethylaluminum chloride, dibutylaluminum chloride, dibutylaluminum bromide, dibutylaluminum iodide, dibutylaluminum fluoride, dihexylaluminum chloride, methylaluminum dichloride, ethylaluminum dibromide, butylaluminum dichloride, pentylaluminum dichloride, diethylaluminum hydride, dibutylaluminum hydride, dihexylaluminum hydride, methylaluminum dihydride, ethylaluminum dihydride, butylaluminum dihydride, and pentylaluminum dihydride. They can be generically classified as compounds having the formula $R_nAlX_{3-n}$ wherein R is a hydrocarbyl group as defined above, X is a halogen, a hydrocarbyloxide, or a hydrogen and n is an integer from 1 to 3.

The hydrocarbylboron compounds that may be incorporated into the catalyst systems have the general formula:

wherein R is a hydrocarbyl group having 1 to 14 carbon atoms. Exemplary groups are trimethylborane, triethylborane, triisobutylborane, and tributylborane. In one embodiment, triethylborane is selected. The hydrocarbylaluminum hydrocarbyloxides, which are commonly termed "alkylaluminum alkoxides", are compounds of the general formula:

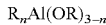

wherein n is an integer from 1 to 2, and R is a hydrocarbyl group having 1 to 14 carbon atoms. In one embodiment, R has 1 to 8 carbon atoms. The hydrocarbyl group can be alkyl, aralkyl, aryl, alkaryl, alicyclic, or bicyclic. Exemplary compounds are methyl, ethyl, propyl, iso-propyl, n-butyl, iso-butyl, n-pentyl, iso-pentyl, t-pentyl, hexyl, cyclohexyl, 2-methy-pentyl, heptyl, octyl, 2-ethylhexyl, cyclohexylmethyl, nonyl, decyl undecyl, dodecyl, tridecyl, tetradecyl, benzyl, pinyl, pinylmethyl, phenethyl p-methybenzyl, phenyl, tolyl, xylyl, naphthyl, ethylphenyl, methynaphthyl, dimethylnaphthyl, norborynyl, and norbornyl methyl. In certain embodiments, the hydrocarbylaluminum hydrocarbyloxide compound is diethylaluminumethoxide.

In all of the above embodiments, the hydrocarbyl groups, the halide groups, and the hydride groups are independently selected, i.e., these groups can be the same or different.

As discussed above, the reaction product of the chromate and the hydrocarbylaluminum compound or hydrocarbyl boron compound is supported. While silica is the preferred support, other inorganic oxides can be used. Exemplary support materials are aluminum phosphate, alumina, silica and alumina mixtures, silica modified with a hydrocarbylaluminum compound such as triethylaluminum, silica modified with diethylzinc, silica modified with a titanium tetrahydrocarbyloxide compound such as titanium tetraisopropoxide, silica/titania cogels, titanias and a mixture of silica and calcium carbonate. A typical support is a dehydrated, solid, particulate porous material essentially inert to the polymerization. It is used as a dry powder having an average particle size of about 2 to about 150 microns and preferably about 10 to about 100 microns; a surface area of about 100 to about 750 square meters per gram and preferably about 240 to about 550 square meters per gram; and a pore size of about 80 Angstroms to about 300 Angstroms and preferably about 120 to about 250 Angstroms.

The catalyst systems can be prepared by reacting the bis-triarylsilyl chromate, the hydrocarbylaluminum compound or hydrocarbyl boron compound, and a dehydrated support material together. The bis-triarylsilyl chromate reacts with hydroxyl groups, which are present on the surface of the support. Thus, the chromate is for the most part chemically adsorbed on the surface of the support. Any part of the chromate, which is not chemically adsorbed, is physically adsorbed on the surface of the support. Usually, about 50 to about 100 percent of the chromate is chemically adsorbed. It should be noted, however, that the chromate retains one or more reactive groups, which react with the hydrocarbyl aluminum or boron compound. The amount of support used is generally that which will provide about 0.01 to about 0.3 millimole of chromium per gram of support and preferably about 0.03 to about 0.1 millimole of chromium per gram of support.

In certain embodiments, the molar ratio of aluminum to chromium in the catalyst systems described above is from about 0.6:1 to about 6:1. In other embodiments, the molar ratio of aluminum to chromium in the catalyst systems described above is from about 1:1 to about 5:1. In still other embodiments, the molar ratio of aluminum to chromium in the catalyst systems described above is from about 1.5:1 to about 4:1.

The processes described herein may be carried out over a range of catalyst concentrations in the fluidized bed. In certain embodiments, the concentration of the catalyst system in the fluidized bed reactor is from about 0.1 parts by weight to about 0.5 parts by weight, based upon 1000 parts by weight of the polyethylene in the fluidized bed. In additional embodiments, the concentration of the catalyst system in the fluidized bed reactor is from about 0.15 parts by weight to about 0.4 parts by weight, based upon 1000 parts by weight of the polyethylene in the fluidized bed. In still other embodiments, the concentration of the catalyst system in the fluidized bed reactor is from about 0.2 parts by weight to about 0.3 parts by weight, based upon 1000 parts by weight of the polyethylene in the fluidized bed.

Catalyst productivity may vary considerably in the processes described herein. In certain embodiments, the catalyst productivity may range from about 1,500 kg to about 8,000 kg of high density polyethylene for each kg of catalyst. In other embodiments, the catalyst productivity may range from about 2,000 kg to about 5,000 kg of high density polyethylene for each kg of catalyst. In additional embodiments, the catalyst productivity may range from about 2,500 kg to about 4,000 kg of high density polyethylene for each kg of catalyst.

The at least one catalyst deactivator may be selected from as any compound or chemical species or combination of compounds and/or chemical species that serve to deactivate a bis-triarylsilyl chromate catalyst system when in contact with the catalyst system and that have boiling points, as determined at the pressures described above, lower than the maximum temperature within the recycle gas line of the processes described herein. In certain embodiments, the at least one catalyst deactivator is selected from oxygen; certain oxygen bearing compounds such as alcohols having 1 to 4 carbon atoms; including methanol, ethanol, and propanol; acetone; phosphorus; certain sulfur-bearing compounds such as sulfur dioxide and carbonyl sulfide; arsenic; halogen-bearing compounds; certain nitrogen-bearing compounds such as nitrogen dioxide, nitric oxide, ammonia, nitrous oxide; carbon monoxide, methanal; diethanolamine; and combinations thereof. In certain embodiments, the at least one deactivator is selected from oxygen, methanol, and mixtures thereof. In other embodiments, the at least one catalyst deactivator is oxygen.

In certain embodiments, the at least one catalyst deactivator has a boiling point, as determined at the pressures described above, lower than the minimum temperature within the recycle gas line. Oxygen, carbon monoxide, nitric oxide, nitrous oxide, diethanolamine, and mixtures thereof are exemplary catalyst deactivators having such boiling points in typical recycle systems.

The at least one catalyst deactivator may be introduced into the recycle gas line over a range of concentrations. As discussed above the at least one catalyst deactivator may be introduced into a recycle gas stream at a location selected from (i) upstream of a recycle gas cooler associated with the fluidized bed reactor, (ii) into the recycle gas cooler, (iii) 2 meters or less downstream of the outlet of the recycle gas cooler, (iv) 1 meter or less downstream of the outlet of the recycle gas cooler, and (v) combinations thereof. Although it is within the contemplation of this disclosure to introduce the at least one catalyst deactivator directly into a recycle gas cooler, from a practical viewpoint, because of the multiple-tube or multiple-chamber structure of typical recycle gas coolers, it is generally impractical or inefficient to introduce the at least one catalyst deactivator directly into the body of a recycle gas cooler. It is generally more practical and efficient to introduce the at least one catalyst deactivator into the recycle gas cooler by introducing the at least one deactivator into the inlet of the recycle gas cooler. For purposes of this disclosure, the term "upstream of the recycle gas cooler" refers to the inlet area of a recycle gas cooler, the recycle line, and associated components in communication with and upstream of the recycle gas cooler.

In certain embodiments, the at least one catalyst deactivator is introduced into the recycle gas line at a location upstream of a recycle gas cooler. In other embodiments, the at least one catalyst deactivator is introduced into the recycle gas line at a location 2 meters or less downstream of the outlet of a recycle gas cooler. In additional embodiments, the at least one catalyst deactivator is introduced into the recycle gas line at a location 1 meter or less downstream of the outlet of a recycle gas cooler. In still other embodiments, the at least one catalyst deactivator is introduced into the recycle gas line at a location into the recycle gas cooler. In other additional embodiments, the at least one catalyst deactivator is introduced into the recycle gas line at a location upstream of a recycle gas cooler and at a location 2 meters or less downstream of the outlet of a recycle gas cooler. In further embodiments, the at least one catalyst deactivator is introduced into the recycle gas line at a location upstream of a recycle gas cooler and at a location 1 meters or less downstream of the outlet of a recycle gas cooler.

In certain embodiments, the at least one catalyst deactivator is introduced into the recycle gas line at a ratio of 0.0075 mole of the at least one catalyst deactivator per 1 million moles of make-up ethylene to about 0.12 mole of the at least one catalyst deactivator per 1 million moles of make-up ethylene in the reaction system. In other embodiments, the at least one catalyst deactivator is introduced into the recycle gas line at a ratio of 0.01 mole of the at least one catalyst deactivator per 1 million moles of make-up ethylene to about 0.08 mole of the at least one catalyst deactivator per 1 million moles of make-up ethylene in the reaction system. In additional embodiments, the at least one catalyst deactivator is introduced into the recycle gas line at a ratio of 0.02 mole of the at least one catalyst deactivator per 1 million moles of make-up ethylene to about 0.06 mole of the at the least one catalyst deactivator per 1 million moles of make-up ethylene in the reaction system.

Figure 2:
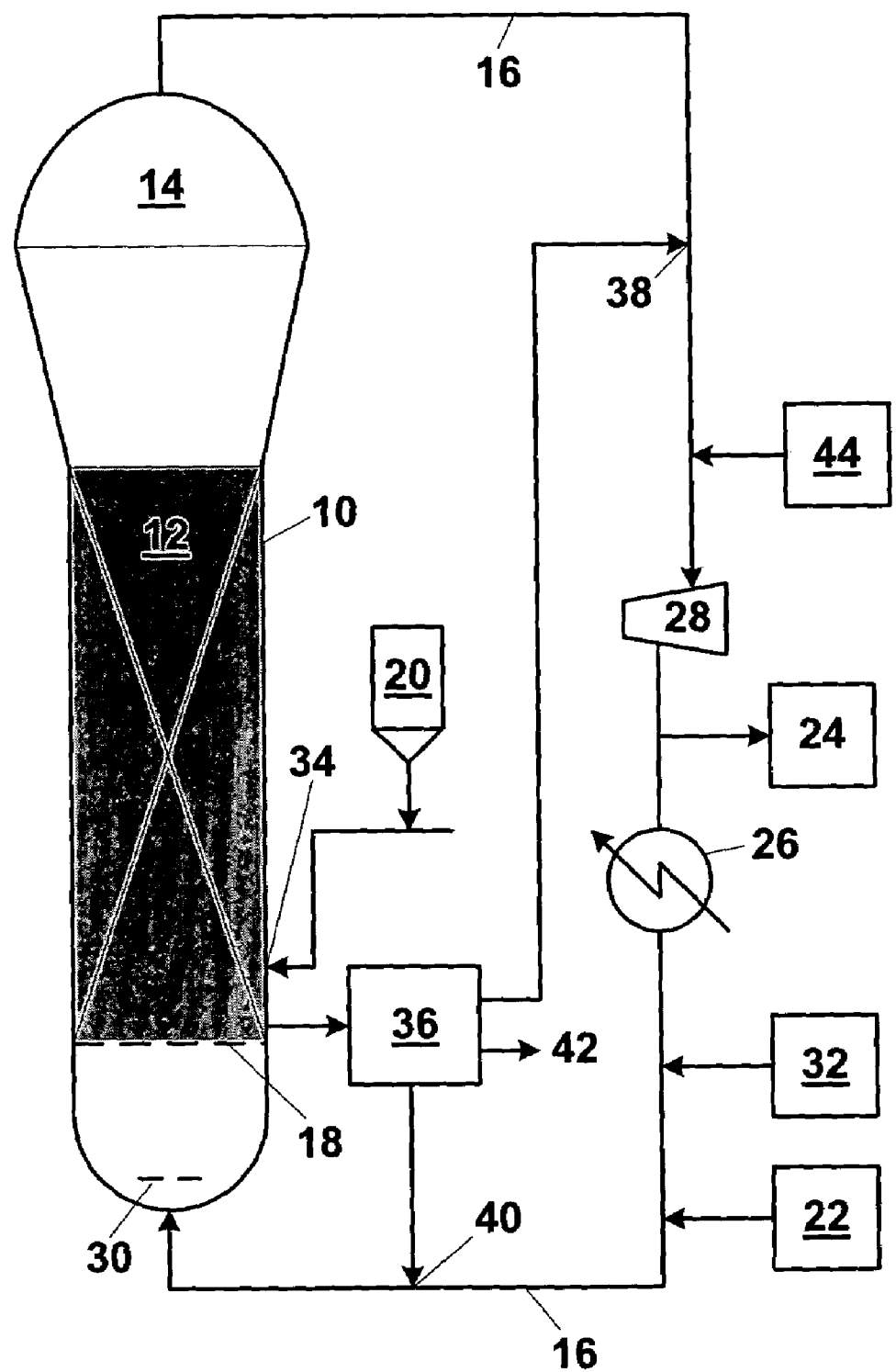
FIG. 2 is a schematic diagram of an exemplary reactor system for producing high density polyethylene having a reduced concentration of UHMW polymeric materials in accordance with the processes described herein.

FIG. 2 provides a schematic representation of an exemplary reaction system for producing high density polyethylene in accordance with the processes described herein. Additional information regarding polyethylene polymerization systems is provided in U.S. Pat. No. 5,352,749 to DeChellis, et al. With reference to FIG. 2, a reactor 10 contains a fluidized bed of polymer particles in a reaction zone 12. A catalyst supply 20 is injected into the reactor near the base of the reaction zone 12 at location 34 to sustain an ongoing polymerization in the reaction zone. Fluidizing gas enters the reaction zone through perforations in the distributor plate 18, at a superficial gas velocity sufficient to fluidize the bed. A typical gas velocity of from about 0.6 m/s to about 0.9 m/s. The fluidizing gas also removes at least a portion of the heat of polymerization reaction. The reactor temperature setpoint is generally in the range of about 80° C. to about 115° C. In certain embodiments, the reactor temperature setpoint is from about 85° C. to about 110° C. In other embodiments, the reactor temperature setpoint is from about 90° C. to about 105° C. The operating pressure of the reactor is generally in the range of about 2000 kPag to about 2500 kPag. In certain embodiments, the operating pressure of the reactor is generally from about 2000 kPag to about 2200 kPag. In other embodiments, the operating pressure of the reactor is generally from about 2200 kPag to about 2450 kPag.

Once polymerization is underway, polymer stream 42 is periodically removed from the reactor through a product discharge system 36. As the fluidizing gas rises through the reaction zone, ethylene and at least one comonomer are consumed by the polymerization reaction. Gases exit the fluidized bed in the velocity reduction or freeboard zone 14. Entrained polymer and/or catalyst particles are largely disengaged from the rising gas in the freeboard zone and fall back to the bed. However, some of these particles remain entrained in the fluidized gas and circulate through the recycle system. Gases exit the reactor into the recycle line 16. The recycle gas is circulated through the reactor loop using a compressor 28. A small slipstream of gas is removed from the recycle line downstream of the compressor and routed to a series of analyzers 24. These analyzers 24 are used to measure the composition of all gaseous components in the recycle stream. The composition of the gas stream withdrawn from the recycle line downstream of the compressor is essentially the same as the composition in the freeboard zone 14. Typically, pressures within the recycle gas line are maintained in a range of about 2,000 kPag to about 2,600 kPag.

The compressed recycle gas enters a cooler 26 that removes heat from the recycle gas stream via sensible or sensible and latent cooling. As described in U.S. Pat. No. 5,462,999 to Griffin, et al., the cooler may discharge up to half (50 wt. %) of the recycle stream as a liquid. Typically, the recycle gas cooler is maintained at a pressure of about 2000 kPa to about 2600 kPa. In certain embodiments, the recycle gas cooler is maintained at a pressure of about 2200 kPa to about 2500 kPa. In other embodiments, the recycle gas cooler is maintained at a pressure of about 2300 kPa to about 2400 kPa.

An inert condensing agent may optionally be provided to the recycle stream at any location but, if provided at all, is typically provided downstream of the cooler 26. The molar concentration of the inert condensing agent is generally in the range of 1% to 30% of the recycle stream. In certain embodiments, the molar concentration of the inert condensing agent is from about 5% to 25% of the recycle stream. In other embodiments, the molar concentration of the inert condensing agent is from about 8% to 20% of the recycle stream.

A co-catalyst or catalyst activator 32 may be injected into the recycle line to enhance performance of the polymerization catalyst. Makeup feeds 22, recovered liquids 40, and, if needed, recovered gases 38 are injected into the recycle line. Generally, the makeup feeds maintain an ethylene molar concentration in the reaction zone of about 40% to about 90%. In certain embodiments, the ethylene molar concentration in the reaction zone is from about 45% to about 75%. In other embodiments, the ethylene molar concentration in the reaction zone is from about 50% to about 70%.

The recycle stream enters the bottom of the reactor 10 and passes through and around a deflector plate 30 designed to keep solids from accumulating under the distributor plate 18.

Introduction of the at least one catalyst deactivator into the recycle line is depicted as being provided by an at least one catalyst deactivator source 44 in communication with the recycle line. The at least one catalyst deactivator source may be any container or supply source capable of providing a stream of the at least one catalyst deactivator. The at least one catalyst deactivator may be provided in pure form. However, in certain embodiments, the at least one catalyst deactivator may be diluted in an inert gas such as nitrogen for better control of the volume of the at least one catalyst deactivator delivered to the recycle stream. If diluted in an inert stream, the at least one catalyst deactivator may be diluted over a range. In certain embodiments, the at least one catalyst deactivator may be diluted by mixing with an inert at a concentration of about 1 mole % to about 10 mole % of the at least one catalyst deactivator in the inert. In certain embodiments, the at least one catalyst deactivator is oxygen and the oxygen is introduced into the recycle line at a molar concentration of about 1 mole % oxygen to about 10 mole % oxygen in a nitrogen stream.

Precise control of the concentration of the at least one catalyst deactivator delivered to the recycle stream is desirable since introduction of the at least one catalyst deactivator at concentrations below about 0.0075 mole of catalyst deactivator per 1 million moles of make-up ethylene may have a negligible impact on the content of the UHMW polymeric material in the high density polyethylene while introduction of the at least one catalyst deactivator at concentrations greater than about 0.1 mole of the at least one catalyst deactivator per 1 million moles of make-up ethylene may result in an reduction of polymerization activity in the fluidized reactor bed since all of the at least one catalyst deactivator may not be consumed in the recycle line. Generally, it is desirable to control the introduction of the at least one catalyst deactivator in the recycle stream at a level that minimizes polymerization in the lower temperature regions within and downstream of the cooler but not in the fluidized reactor bed.

In certain embodiments in which the at least one catalyst deactivator is added to the recycle stream at a location in the recycle line downstream of the recycle cooler, the benefit of reducing the UHMW polymeric material content in the high density polyethylene is achieved by introducing the at least one catalyst deactivator into the recycle line within 2 meters downstream of the outlet of the recycle cooler. The beneficial reduction of the UHMW material is attenuated the further downstream the at least one catalyst deactivator is introduced. Introducing the at least one catalyst deactivator into the recycle line more than 2 meters downstream of the outlet of the recycle cooler provides no beneficial reduction in UHMW material content and impairs catalyst activity in the fluidized bed. In other embodiments, it is necessary to introduce the at least one catalyst deactivator into the recycle line within 1 meter downstream of the outlet of the recycle cooler to beneficially reduce UHMW material content and to avoid impairing catalyst activity in the fluidized bed.

The at least one catalyst deactivator may be introduced into the recycle line over a wide temperature range. In certain embodiments, the at least one catalyst deactivator is introduced at ambient temperature. The at least one catalyst deactivator may be introduced into the recycle stream over a wide pressure range as well. Generally, the at least one catalyst deactivator may be introduced into the recycle stream at any pressure above the pressure of the recycle stream.

In the embodiment depicted, the injection point for the at least one catalyst deactivator is upstream of the compressor 28. However, in accordance with certain embodiments of the processes described herein, the at least one catalyst deactivator may be delivered to the recycle stream at location downstream of the compressor but upstream of the recycle stream cooler 26. In accordance with other embodiments of the processes described herein the injection point may be a location selected from locations upstream of the recycle gas cooler 26, into the recycle gas cooler 26, a location 2 meters or less downstream of the outlet of the recycle gas cooler 26, a location 1 meter or less downstream of the outlet of the recycle gas cooler 26, and combinations thereof.

As discussed above, introduction of the at least one catalyst deactivator in the recycle line at a location upstream of the recycle stream cooler 26 inhibits polymerization into UHMW polymeric materials in the lower temperature regions of the reaction system within and downstream of the recycle line cooler 26. In particular, these lower temperature regions exist from the cooler 26 to the distributor plate 18.

Experimental Evaluation

Figure 3:
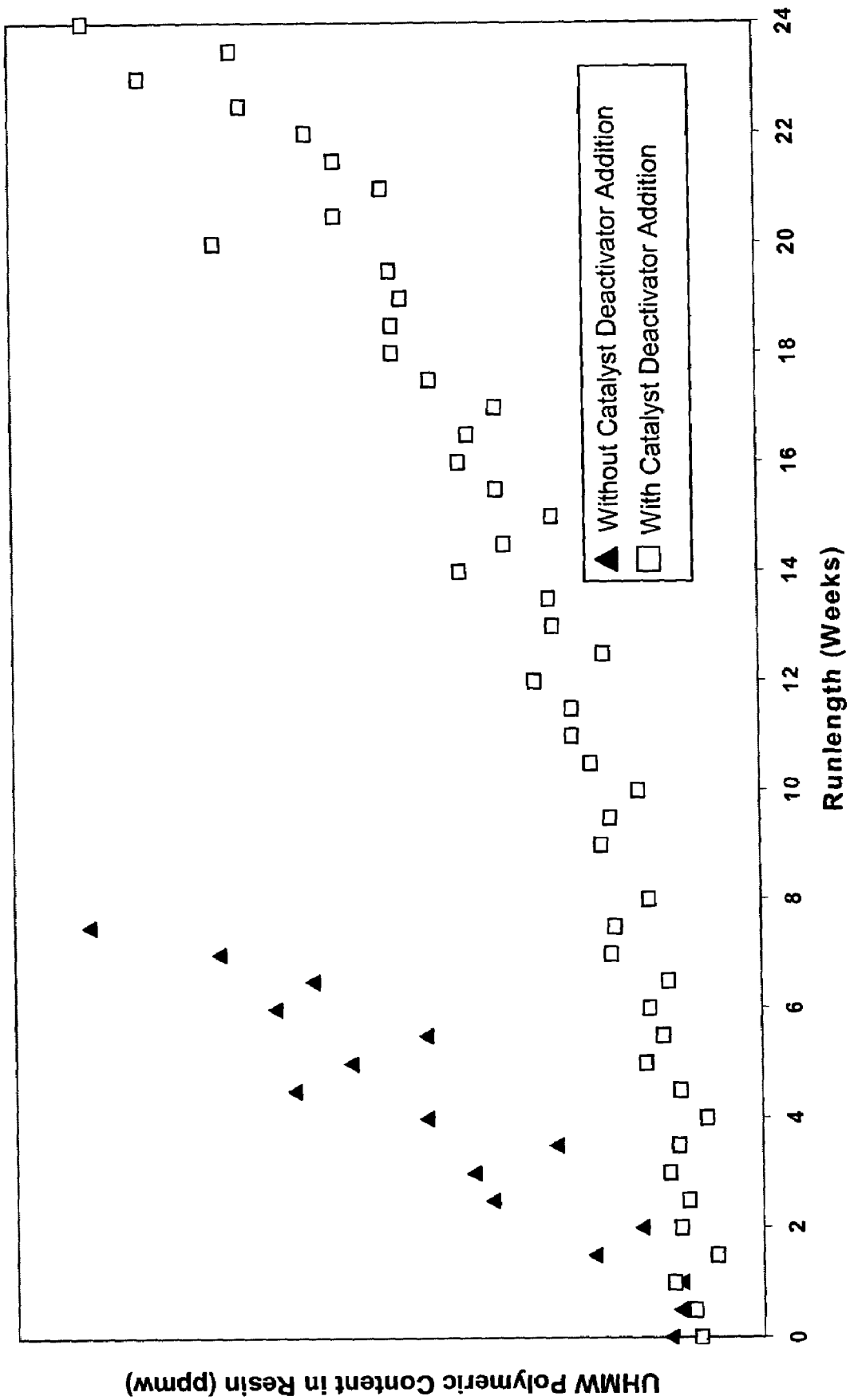
FIG. 3 is a graphical representation of UHMW polymeric material content over time for high density polyethylene that may be produced according to the processes described herein and high density polyethylene that may be produced according to conventional processes.

FIG. 3 is a graphical representation of UHMW polymeric material content over time for high density polyethylene that may be produced according to the processes described herein and high density polyethylene that may be produced according to conventional processes. The UHMW polymeric material content in the high density polyethylene may increase as the time period after the reaction system is cleaned and serviced increases. In conventional processes, the increase in the UHMW polymeric material content is expected to be fairly rapid and somewhat sinusoidal in nature with the overall curve increasing over time, as shown by the collection of data points designated by triangles in the graph. However, the UHMW polymeric material content of the high density polyethylene produced by the processes described herein in which the at least one catalyst deactivator is added to the recycle stream would be expected to increase more slowly as shown by the collection of data points designated by squares in the graph.

Figure 4:
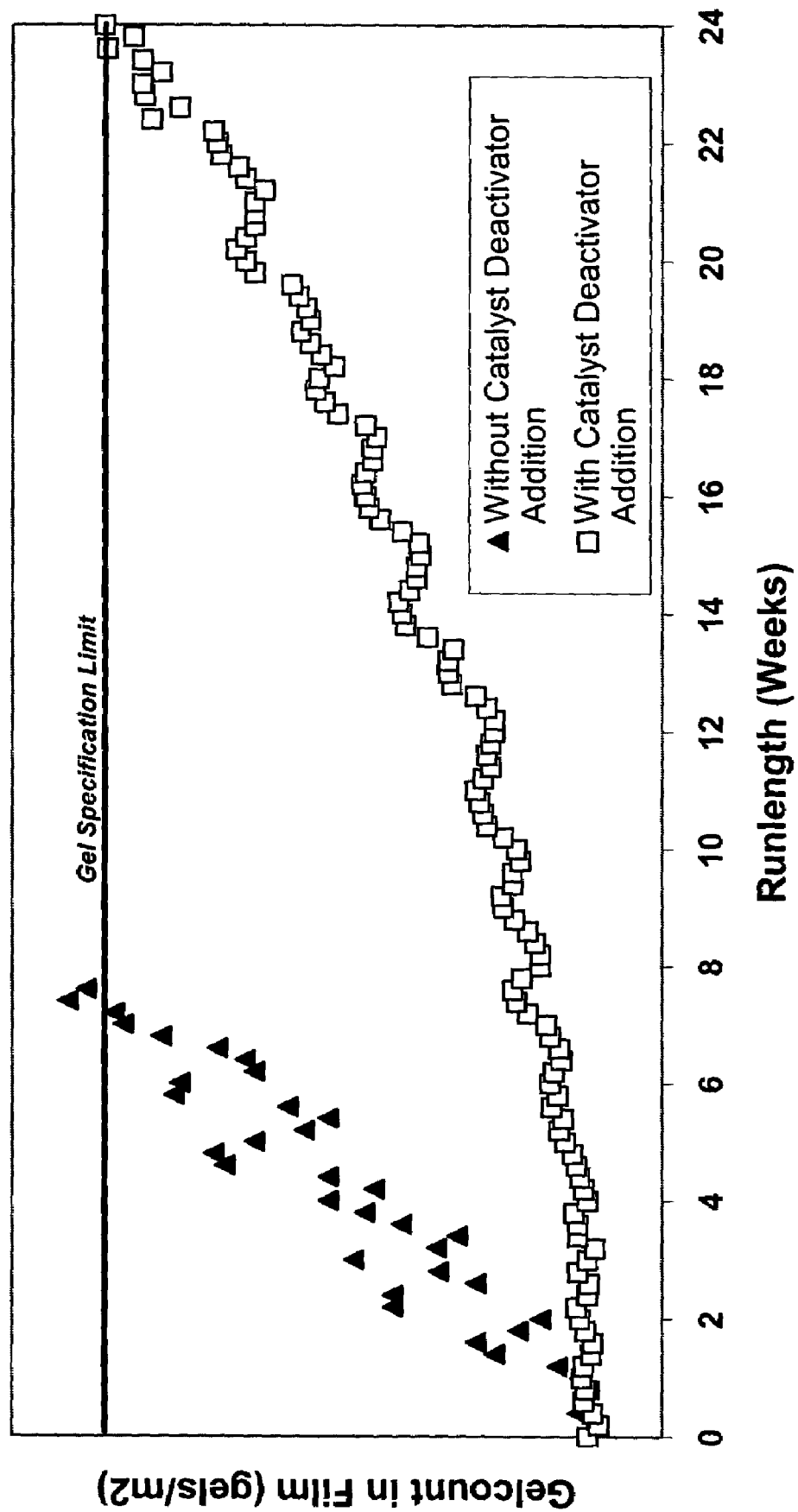
FIG. 4 is a graphical representation of gel counts over time for films that may be produced according to the processes described herein and for films that may be produced according to conventional processes.

FIG. 4 is a graphical representation of gel counts over time for films that may be produced according to the processes described herein versus films that may be produced according to conventional processes. The gel content of the high density polyethylene films and articles may increase as the time period after the reaction system is cleaned and serviced increases. In conventional processes, this increase is expected to be somewhat sinusoidal in nature with the overall curve increasing relatively sharply over time, as shown with the collection of data points designated by triangles in the graph. On the other hand, the gel content of a film produced with resin produced by the processes of the current invention in which the at least one catalyst deactivator is added to the recycle stream would be expected to increase more slowly as shown by the collection of data points designated by squares in the graph.

The high density polyethylene produced by the processes described herein may be used to produce a variety of different types of products exhibiting reduced gel content. Among the products that may be produced using the high density polyethylene are films, geomembranes, sheets, molded objects, extruded forms, and thermoformed objects. These various products exhibiting reduced gel contents may be produced by any suitable production techniques for producing such products from high density polyethylene.

With respect to the various ranges set forth herein, any upper limit recited may, of course, be combined with any lower limit for selected sub-ranges.

All patents and publications, including priority documents and testing procedures, referred to herein are hereby incorporated by reference in their entireties.

Although the present invention and its advantages have been described in detail, it should be understood that various changes, substitutions, and alterations could be made without departing from the spirit and scope of the invention as defined by the following claims.

What is claimed is:

1. A process for reducing ultra high molecular weight polymeric material in a polyethylene resin comprising:
   (i) contacting a mixture comprising ethylene with a catalyst system comprising the supported reaction product of at least one bis-hydrocarbylsilyl chromate and at least one compound selected from the group consisting of hydrocarbylaluminum compounds and hydrocarbylboron compound in a fluidized bed reactor to provide a polyethylene resin having a density of about 0.94 g/cm$^3$ to about 0.965 g/cm$^3$;
   (ii) providing a recycle gas stream to the fluidized bed reactor through a recycle gas line having a recycle gas cooler in fluid communication therewith; and
   (iii) providing a stream comprising make-up ethylene to the fluidized bed reactor, wherein at least one catalyst deactivator having a boiling point, as determined at 101.3 kPag, lower than the maximum temperature within the recycle gas line is provided to the recycle gas line not more than 2 meters from the recycle gas cooler outlet or upstream thereof to reduce the concentration of ultra high molecular weight polymeric material in the polyethylene resin.

2. The process of claim 1, wherein the at least one catalyst deactivator is provided to the recycle gas line at a ratio of 0.0075 mole of the at least one catalyst deactivator per 1 million moles of make-up ethylene to about 0.12 mole of the at least one catalyst deactivator per 1 million moles of make-up ethylene in the reaction system.

3. The process of claim 1, wherein the recycle gas line comprises an upstream portion of the recycle gas line and a downstream portion of the recycle gas line wherein the upstream portion of the recycle gas line is provided upstream of the recycle gas cooler and wherein the downstream portion of the recycle gas line is provided downstream of the recycle gas cooler, and wherein the at least one catalyst deactivator is provided to the recycle gas line at a location upstream of the recycle gas cooler, into the recycle gas cooler, or 1 meter or less downstream of the outlet of the recycle gas cooler.

4. The process of claim 1, wherein the mixture comprising ethylene comprises at least one comonomer.

5. The process of claim 3, wherein the at least one catalyst deactivator is provided to the upstream portion of the recycle gas line.

6. The process of claim 1, wherein the at least one catalyst deactivator is selected from the group consisting of oxygen, methanol, carbon monoxide, and mixtures thereof.

7. The process of claim 1, wherein the catalyst concentration in the fluidized bed is from about 0.1 parts by weight to about 0.5 parts by weight, based upon 1000 parts by weight of the polyethylene in the fluidized bed.

8. The process of claim 1, wherein the at least one catalyst deactivator is oxygen.

9. The process of claim 1, wherein the at least one catalyst deactivator is provided to the recycle gas line at a ratio of 0.01 mole of the at least one catalyst deactivator per 1 million moles of make-up ethylene to about 0.08 mole of the at least one catalyst per 1 million moles of make-up ethylene in the reaction system.

10. The process of claim 1, wherein the molar ratio of aluminum to chromium in the catalyst system is from about 1:1 to about 5:1.

11. The process of claim 1, wherein the reactor is at a temperature of about 85° C. to about 105° C. and a pressure of about 2000 kPag to about 2500 kPag.

12. The process of claim 1, wherein the catalyst concentration in the fluidized bed reactor is from about 0.15 parts by weight to about 0.4 parts by weight, based upon 1000 parts by weight of the polyethylene in the fluidized bed.

13. The process of claim 4, wherein the at least one comonomer is selected from the group consisting of butene, pentene, hexene, octene, and mixtures thereof.

14. The process of claim 1, wherein the fluidized bed is at a pressure from about 2000 kPag to about 2200 kPag.

15. The process of claim 1, wherein the fluidized bed is at a pressure from about 2200 kPag to about 2500 kPag.

16. The process of claim 1, wherein the molar concentration of ethylene in the fluidized bed reactor is from about 40% to about 90%.

17. The process of claim 1, wherein the at least one catalyst deactivator is provided to the recycle gas line at a ratio of 0.02 mole of the at least one catalyst deactivator per 1 million moles of make-up ethylene to about 0.06 mole of the at least one catalyst deactivator per 1 million moles of make-up ethylene in the reaction system.

18. The process of claim 1, wherein the molar ratio of aluminum to chromium in the catalyst system is from about 1.5:1 to about 4:1.

19. The process of claim 3, wherein the recycle gas cooler is at a pressure of about 2100 kPa to about 2600 kPa.

20. The process of claim 4, wherein the molar ratio of the at least one comonomer to ethylene in the fluidized bed reactor is about 0.001:1 to about 0.15:1.

21. The process of claim 1, wherein hydrogen is introduced into the fluidized bed reactor at a concentration in the range of about 0.005 to about 0.08 mole of hydrogen per mole of ethylene.

22. The process of claim 1, wherein the fluidized bed reactor is maintained at a temperature of about 90° C. to about 100° C.

23. The process of claim 1, wherein the molar concentration of ethylene in the fluidized bed reactor is from about 45% to about 75%.

24. The process of claim 1, wherein the at least one catalyst deactivator has a boiling point, as determined at 101.3 kPag, lower than the minimum temperature within the recycle gas line.

25. A process for reducing the concentration of ultra high molecular weight polymeric material in a polyethylene resin having a density of about 0.94 g/cm$^3$ to about 0.965 g/cm$^3$ produced in a gas phase reaction system with a bis-triarylsilyl chromate catalyst system comprising:

contacting a mixture comprising ethylene with a catalyst system comprising the supported reaction product of at least one bis-hydrocarbylsilyl chromate and at least one compound selected from the group consisting of hydrocarbylaluminum compounds and hydrocarbylboron compound in a fluidized bed reactor;

providing a recycle gas stream to the fluidized bed reactor through a recycle gas line having a recycle gas cooler in fluid communication therewith, the recycle gas cooler having an outlet; and providing a stream comprising make-up ethylene to the reaction system, wherein at least one catalyst deactivator having a boiling point, as determined at the highest pressure within the recycle gas line, lower than the maximum temperature within the recycle gas line is provided to the recycle gas line not more than 2 meters from the recycle gas cooler outlet or upstream thereof to reduce the concentration of ultra high molecular weight polymeric material in the polyethylene resin.

26. A process for reducing the gel content in an article produced from high density polyethylene comprising producing the article from a high density polyethylene produced in accordance with the process of:

(i) contacting a mixture comprising ethylene with a catalyst system comprising the supported reaction product of at least one bis-hydrocarbylsilyl chromate and at least one compound selected from the group consisting of hydrocarbylaluminum compounds and hydrocarbylboron compound in a fluidized bed reactor to provide a polyethylene resin having a density of about 0.94 g/cm$^3$ to about 0.965 g/cm$^3$;

(ii) providing a recycle gas stream to the fluidized bed reactor through a recycle gas line having a recycle gas cooler in fluid communication therewith; and (iii) providing a stream comprising make-up ethylene to the fluidized bed reactor, wherein at least one catalyst deactivator having a boiling point, as determined at 101.3 kPag, lower than the maximum temperature within the recycle gas line is provided to the recycle gas line not more than 2 meters from the recycle gas cooler outlet or upstream thereof to reduce the concentration of ultra high molecular weight polymeric material in the polyethylene resin.

27. The process according to claim 26, wherein the article is a film.

28. The process of claim 26, wherein the article is a molded article.

29. A process for reducing the concentration of ultra high molecular weight polymeric material in a polyethylene resin having a density of about 0.94 g/cm$^3$ to about 0.965 g/cm$^3$ produced in a gas phase reaction system with a bis-triarylsilyl chromate catalyst system comprising:

contacting a mixture comprising ethylene with a catalyst system comprising the supported reaction product of at least one bis-hydrocarbylsilyl chromate and at least one compound selected from the group consisting of hydrocarbylaluminum compounds and hydrocarbylboron compound in a fluidized bed reactor;

providing a recycle gas stream to the fluidized bed reactor through a recycle gas line; and providing a stream comprising make-up ethylene to the reaction system, wherein at least one catalyst deactivator having a boiling point, as determined at 101.3 kPag, lower than the maximum temperature within the recycle gas line is provided to the recycle gas line, the maximum temperature within the recycle gas line is about 110° C., and the maximum pressure within the recycle gas line is about 2,000 kPag to about 2,600 kPag.

30. The process of claim 29, wherein the at least one catalyst deactivator is provided to the recycle gas line at a ratio of 0.0075 mole of the at least one catalyst deactivator per 1 million moles of make-up ethylene to about 0.12 mole of the at least one catalyst deactivator per 1 million moles of make-up ethylene in the reaction system.

31. The process of claim 29, wherein the at least one catalyst deactivator is provided to the recycle gas line at a ratio of 0.01 mole of the at least one catalyst deactivator per 1 million moles of make-up ethylene to about 0.08 mole of the at least one catalyst per 1 million moles of make-up ethylene in the reaction system.

32. The process of claim 29, wherein the at least one catalyst deactivator is provided to the recycle gas line at a ratio of 0.02 mole of the at least one catalyst deactivator per 1 million moles of make-up ethylene to about 0.06 mole of the at least one catalyst deactivator per 1 million moles of make-up ethylene in the reaction system.

33. The process of claim 29, wherein the recycle gas line comprises an upstream portion of the recycle gas line and a downstream portion of the recycle gas line wherein the upstream portion of the recycle gas line is provided upstream of a recycle gas cooler and wherein the downstream portion of the recycle gas line is provided downstream of the recycle gas cooler, and wherein the at least one catalyst deactivator is provided to the recycle gas line at a location selected from the group consisting of (i) upstream of the recycle gas cooler, (ii) into the recycle gas cooler, (iii) 2 meters or less downstream of an outlet of the recycle gas cooler, (iv) 1 meter or less downstream of the outlet of the recycle gas cooler, and (v) combinations thereof.

34. The process of claim 33, wherein the at least one catalyst deactivator is provided to the upstream portion of the recycle gas line.

35. The process of claim 29, wherein the at least one catalyst deactivator is selected from the group consisting of oxygen, methanol, carbon monoxide, and mixtures thereof.

36. The process of claim 29, wherein the at least one catalyst deactivator is oxygen.

37. The process of claim 29, wherein the at least one catalyst deactivator has a boiling point, as determined at 101.3 kPag, lower than the minimum temperature within the recycle gas line.

38. The process of claim 29, wherein the catalyst concentration in the fluidized bed is from about 0.1 parts by weight to about 0.5 parts by weight, based upon 1000 parts by weight of the polyethylene in the fluidized bed.

39. The process of claim 29, wherein the catalyst concentration in the fluidized bed reactor is from about 0.15 parts by weight to about 0.4 parts by weight, based upon 1000 parts by weight of the polyethylene in the fluidized bed.

40. The process of claim 29, wherein the molar ratio of aluminum to chromium in the catalyst system is from about 1:1 to about 5:1.

41. The process of claim 29, wherein the reactor is at a temperature of about 85° C. to about 105° C. and a pressure of about 2000 kPag to about 2500 kPag.

42. The process of claim 29, wherein the fluidized bed is at a pressure from about 2000 kPag to about 2200 kPag.

43. The process of claim 29, wherein the fluidized bed is at a pressure from about 2200 kPag to about 2500 kPag.

44. The process of claim 29, wherein the fluidized bed is maintained at a temperature of about 90° C. to about 100° C.

45. The process of claim 29, wherein the mixture comprising ethylene comprises at least one comonomer.

46. The process of claim 45, wherein the at least one comonomer is selected from the group consisting of butene, pentene, hexene, octene, and mixtures thereof.

47. The process of claim 45, wherein the molar ratio of the at least one comonomer to ethylene in the fluidized bed reactor is about 0.001:1 to about 0.15:1.

48. The process of claim 29, wherein the molar concentration of ethylene in the fluidized bed reactor is from about 40% to about 90%.

49. The process of claim 29, wherein the molar ratio of aluminum to chromium in the catalyst system is from about 1.5:1 to about 4:1.

50. The process of claim 33, wherein the recycle gas cooler is at a pressure of about 2100 kPa to about 2600 kPa.

51. The process of claim 29, wherein hydrogen is introduced into the fluidized bed reactor at a concentration in the range of about 0.005 to about 0.08 mole of hydrogen per mole of ethylene.

52. The process of claim 29, wherein the molar concentration of ethylene in the fluidized bed reactor is from about 45% to about 75%.

53. A process for reducing the concentration of ultra high molecular weight polymeric material in a polyethylene resin having a density of about 0.94 g/cm$^3$ to about 0.965 g/cm$^3$ produced in a gas phase reaction system with a bis-triarylsilyl chromate catalyst system comprising:

contacting a mixture comprising ethylene with a catalyst system comprising the supported reaction product of at least one bis-hydrocarbylsilyl chromate and at least one compound selected from the group consisting of hydrocarbylaluminum compounds and hydrocarbylboron compound in a fluidized bed reactor;

providing a recycle gas stream to the fluidized bed reactor through a recycle gas line; and providing a stream comprising make-up ethylene to the reaction system, wherein:

at least one catalyst deactivator having a boiling point, as determined at 101.3 kPag, lower than the maximum temperature within the recycle gas line is provided to the recycle gas line;

the recycle gas line comprises an upstream portion of the recycle gas line and a downstream portion of the recycle gas line.

\* \* \* \* \*